(12) United States Patent
Royt

(10) Patent No.: US 9,290,240 B1  
(45) Date of Patent: Mar. 22, 2016

(54) DECK HOOK HAVING IMPROVED LOADING FUNCTIONALITY

(71) Applicant: Peck & Hale, L.L.C., West Sayville, NY (US)

(72) Inventor: Joseph Royt, Fresh Meadows, NY (US)

(73) Assignee: Peck & Hale, L.L.C., West Sayville, NY (US)

( * ) Notice: Subject to any disclaimer, the term of this patent is extended or adjusted under 35 U.S.C. 154(b) by 0 days.

(21) Appl. No.: 14/335,781

(22) Filed: Jul. 18, 2014

Related U.S. Application Data

(60) Provisional application No. 61/847,845, filed on Jul. 18, 2013.

(51) Int. Cl.
*B60P 7/08* (2006.01)
*B63B 25/28* (2006.01)

(52) U.S. Cl.
CPC ............... *B63B 25/28* (2013.01); *B60P 7/0807* (2013.01)

(58) Field of Classification Search
CPC .......... B60P 7/0807; B60P 3/07; B60P 3/122; B60P 7/0823; B60P 7/0815; F16B 13/0808; F16B 45/00; F16B 13/00; B60R 7/02; B61D 45/001

USPC ......... 410/106, 116, 101, 110, 112, 100, 102, 410/104, 105, 107, 109, 115, 97; 248/499, 248/500, 647; 296/183.1

See application file for complete search history.

(56) References Cited

U.S. PATENT DOCUMENTS

| | | | |
|---|---|---|---|
| 4,229,132 A | 10/1980 | Taylor | |
| 4,630,982 A * | 12/1986 | Fenner | 410/102 |
| 4,969,784 A * | 11/1990 | Yanke | 410/104 |
| 5,052,869 A * | 10/1991 | Hansen, II | 410/111 |
| 5,738,471 A * | 4/1998 | Zentner et al. | 410/110 |
| 6,793,449 B1 | 9/2004 | Simpson et al. | |
| 8,128,325 B2 | 3/2012 | Sellberg et al. | |
| 8,414,237 B2 | 4/2013 | Grasso | |
| 8,529,176 B2 | 9/2013 | Jutila et al. | |
| 8,591,156 B2 | 11/2013 | Grone | |
| 2008/0145171 A1 * | 6/2008 | Smetz | 410/101 |

OTHER PUBLICATIONS

Drawing, Tiedown Assembly, 2012.

* cited by examiner

*Primary Examiner* — Glenn Dayoan
*Assistant Examiner* — Sunsurraye Westbrook
(74) *Attorney, Agent, or Firm* — Schroeder Law PC

(57) ABSTRACT

A deck hook capable of accepting loading forces in multiple directions and of distributing such forces over an increased deck surface area thereby reducing the risk of damage to the deck, particularly when the deck is formed of a non-steel material.

16 Claims, 5 Drawing Sheets

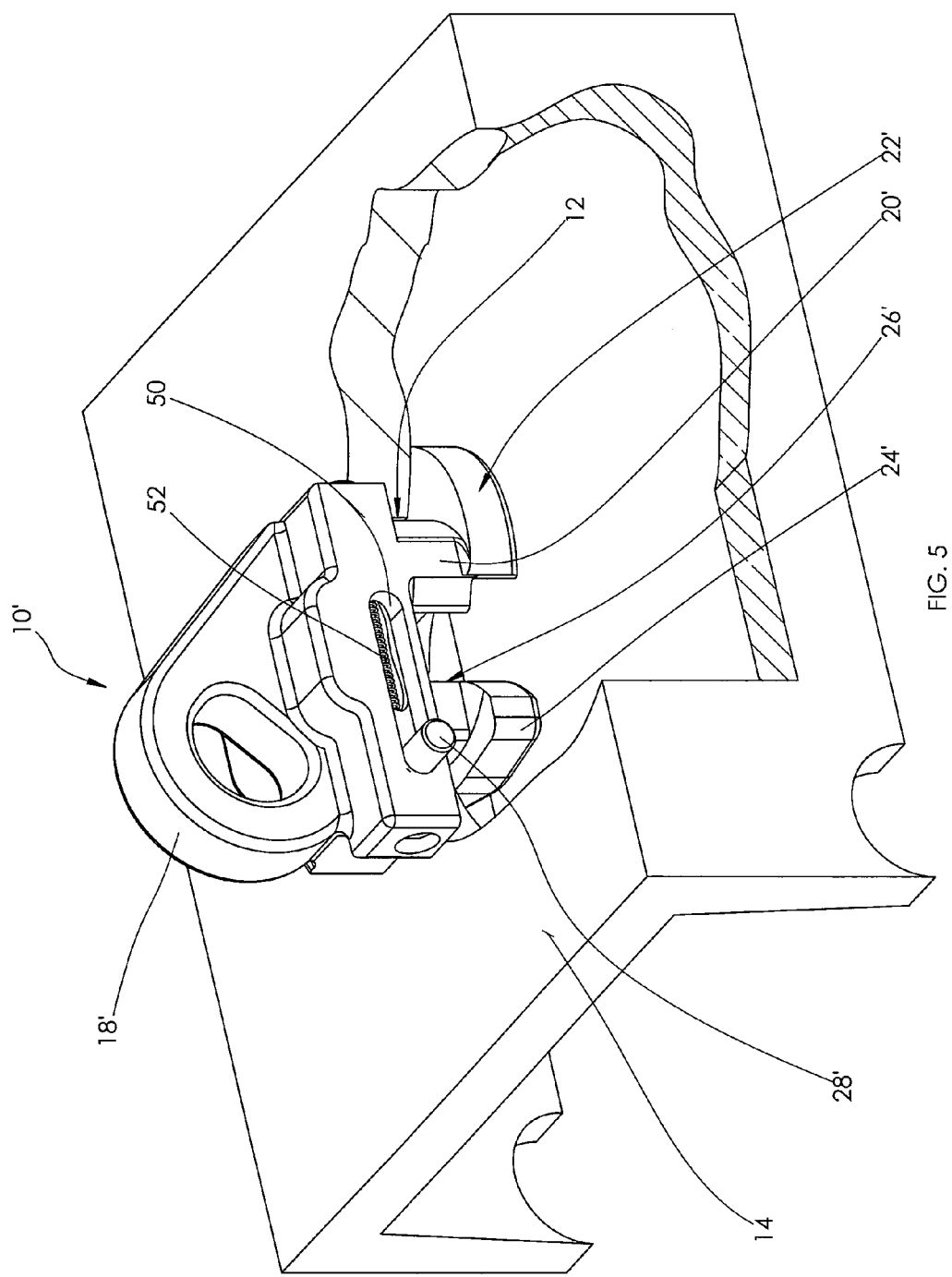

DECK HOOK HAVING IMPROVED LOADING FUNCTIONALITY

BACKGROUND OF THE INVENTION

The present invention relates to deck hooks and, more particularly, to a deck hook capable of accepting loading forces in multiple directions and of distributing such forces over an increased deck surface area.

Vessels, particularly ships, are often designed with circular openings in the deck sized to receive what is commonly referred to as a "deck hook". One typical-sized opening has a diameter of 1.75 inches. Various prior art deck hooks are sized to engage with this 1.75 inch diameter opening. As will be understood by those skilled in the art, a typical deck hook includes a deck-engaging base member which is maneuvered into the opening in the deck for engagement therewith, a fixed lashing point which extends above the surface of the deck, and a neck extending through the opening and connecting the lashing point to the base member. These prior art deck hooks must typically be oriented in a particular direction to ensure proper lashing of the cargo.

Although in the past many transportation vessels, namely ships, were built with steel decks, newer ships are being built with aluminum decks. These newer ships still rely upon the usage of decks hooks to secure cargo to the deck. However, the change in material from steel to aluminum increases the risk that usage of the prior art deck hook may damage the deck of the vessel when subjected to loading.

There is therefore the need in the art for a deck hook having the capability 1) to accept loading forces in multiple directions thereby improving the functionality of the device, and 2) to distribute such forces over an increased deck surface area thereby reducing the risk of damage to the deck, particularly when the deck is formed of a non-steel material.

SUMMARY OF THE INVENTION

The present invention, which addresses the needs of the prior art, provides a deck hook for removably coupling with an engagement opening formed in the deck of a vessel. The engagement opening has a diameter D1, and the vessel defines an upper surface and a lower surface. The deck hook includes a body member, a lashing eyelet located at one end of the body member, a first foot connected to the other end of the body member, the first foot positioned and sized to engage at least a portion of the lower surface of the deck. The deck hook further includes a second foot positioned to cooperate with the first foot to secure the hook to the engagement opening. The second foot is movable between an insertion position wherein the first foot and the second foot define a diameter D2 and an securement position wherein the first foot and the second foot define a diameter D3, the diameter D2 being less than the diameter D1, and the diameter D3 being greater than the diameter D1.

In one preferred embodiment, the present invention provides a second leg which extends from the body member and which is rotatably connected thereto. The second foot extends from the second leg. The second leg is rotatable between the insertion position wherein the first foot and the second foot define the diameter D2 and the securement position wherein the first foot and the second foot define the diameter D3.

As a result, the present invention provides a a deck hook having the capability 1) to accept loading forces in multiple directions thereby improving the functionality of the device, and 2) to distribute such forces over an increased deck surface area thereby reducing the risk of damage to the deck, particularly when the deck is formed of a non-steel material.

BRIEF DESCRIPTION OF THE DRAWINGS

FIG. 5 is a perspective view of an alternative embodiment of the present invention.

DETAILED DESCRIPTION OF THE INVENTION

Figure 1:
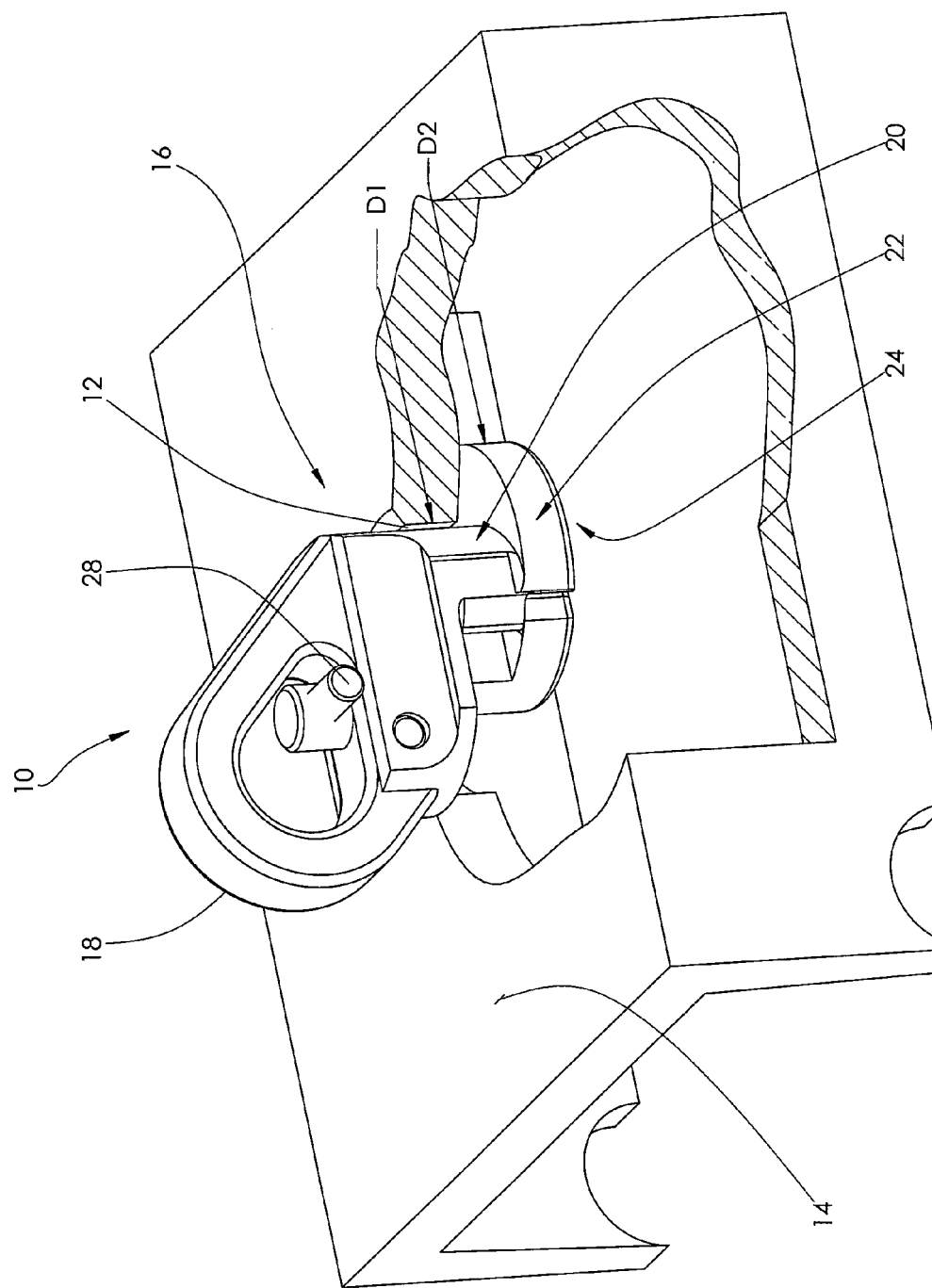
FIG. 1 is a perspective view showing the deck hook of the present invention installed within the circular opening formed in the deck of a transportation vessel, the deck hook being shown in the insertion position.
Figure 2:
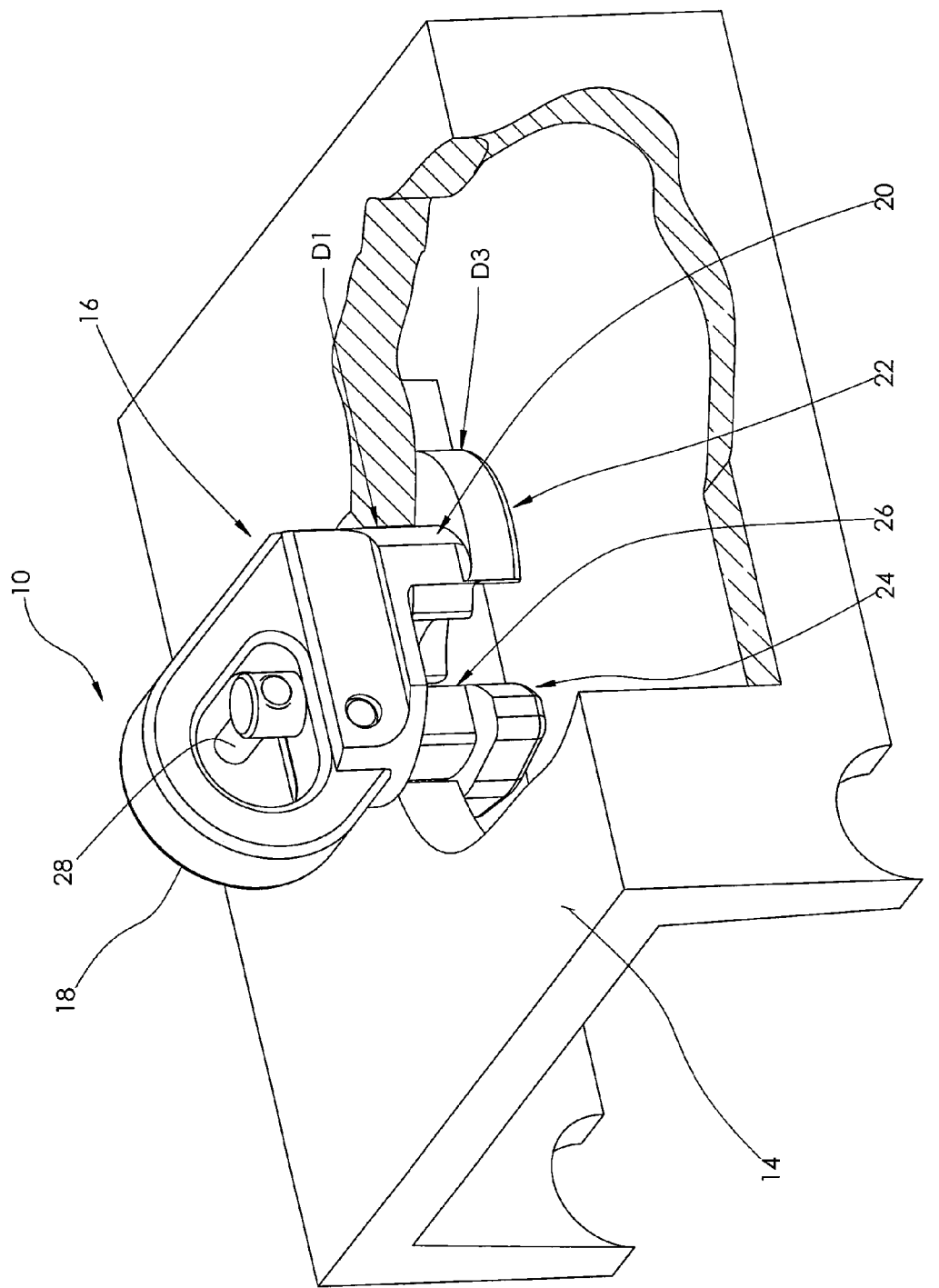
FIG. 2 is a perspective view showing the deck hook of FIG. 1 in the securement position.

An improved deck hook, i.e., hook 10, is shown in FIGS. 1-4. Hook 10 is designed to engage an opening 12 (having a typical 1.75 inch diameter D1) formed in deck 14 of a transportation vessel, e.g., a ship. Hook 10 includes a body member 16 defining a lashing eyelet 18, a fixed leg 20 and a first foot 22. Hook 10 further includes a second foot 24, which is connected to body member 16 via rotatable leg 26. A handle 28 may be secured to one end of rotatable leg 26 to facilitate rotation of foot 24 from the insertion position shown in FIG. 1 to the securement position shown in FIG. 2.

As mentioned, foot 24 is shown in the insertion position in FIG. 1. When in the insertion position, foot 22 and foot 24 define an outer diameter D2, which is less than diameter D1 of opening 12. Hook 10 may therefore be secured to deck 14 by inserting foot 22 and foot 24 through opening 12. Once fully inserted, foot 24 is rotated to the securement position shown in FIG. 2. This rotation may be accomplished by use of a handle 28. When in the securement position, foot 22 and foot 24 define an outer diameter D3, which is greater than diameter D1 of opening 12.

It is contemplated herein that body member 16 may include a detent mechanism for securing foot 24 in the securement position. It is also contemplated herein that rotatable leg 26 may be biased to the securement position such that a force must be applied to rotate foot 24 to the insertion position. Once such force is removed, foot 24 returns (due to the biasing force) to the securement position. It is further contemplated herein that body member 16 may include a latching device which automatically secures foot 24 in the securement position once foot 24 is fully rotated. To remove hook 10 from deck 14, it would then be necessary to apply a mechanical force to open the latching device. Thus, the use of a latching device could further reduce/eliminate any likelihood of inadvertent disengagement of hook 10 deck 14.

Figure 3:
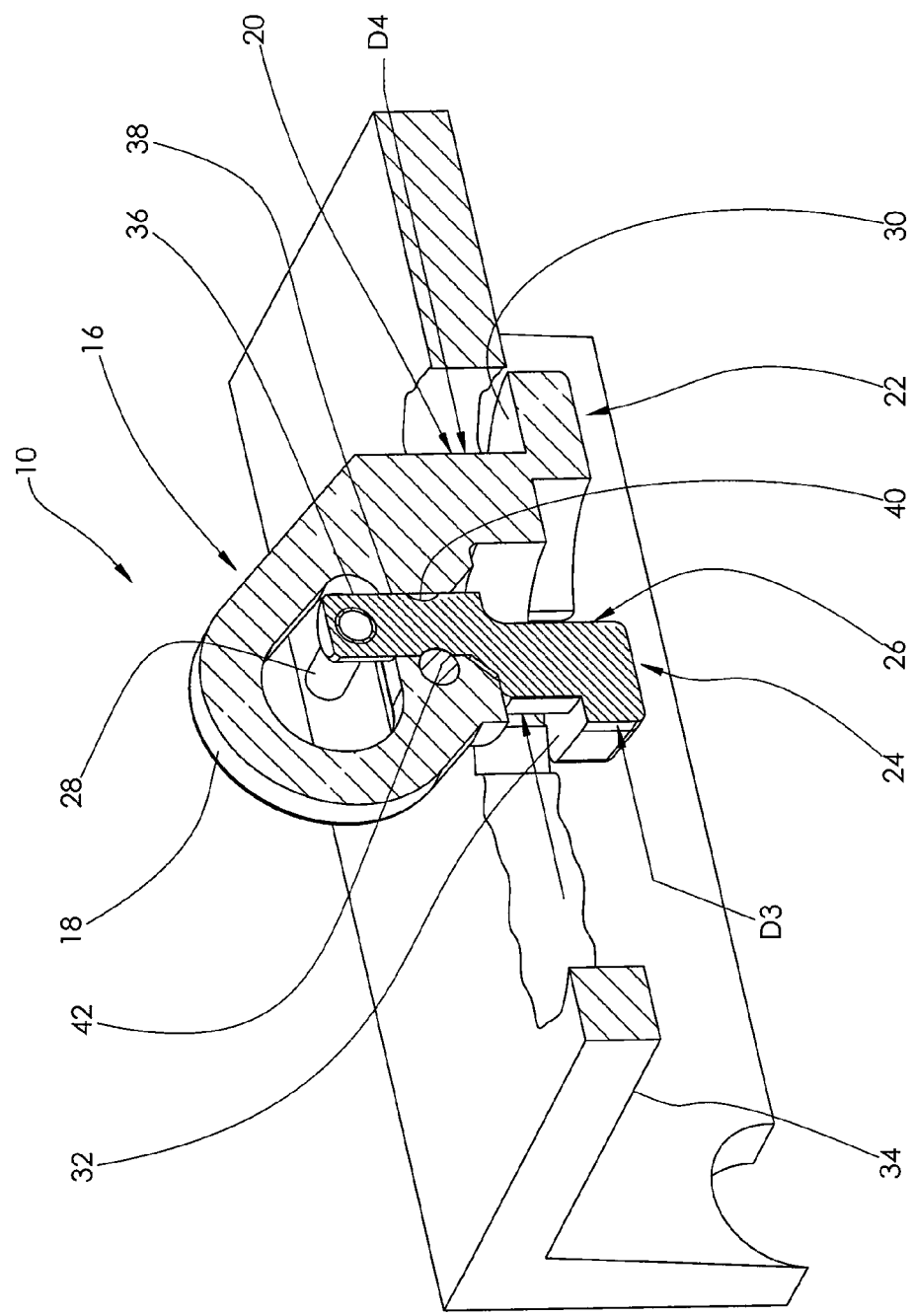
FIG. 3 is a cross-sectional view taken through FIG. 2.

As best shown in FIG. 3, fixed foot 22 includes a deck-engaging surface 30, while foot 24 includes a deck-engaging surface 32. Both surfaces 30, 32 contact and engage lower surface 34 of deck 14. Because of the novel design of hook 10 which allows the hook to be inserted into opening 12 while foot 24 is rotated to the insertion position, the total surface engagement area available to contact lower deck surface 34 can be increased. In other words, the combined surface engagement area of surfaces 30 and 32 is greater than the surface engagement area of the prior art hooks. As a result, this distributes the loading force applied to eyelet 18 over a greater surface area of deck 14. This distribution of the loading force reduces the likelihood that the deck hook will cause damage to an aluminum deck.

The novel design of the present invention also provides a hook wherein the outer diameter of the device in the region which passes through deck 14 can be increased in comparison to prior art hooks. More particularly, the outer diameter defined by leg 20 and leg 26 in the region which passes through deck 14 (i.e., diameter D4) is preferably selected to be as close to the 1.75 inch diameter (D1) opening as design parameters allow. This increased diameter is advantageous in that it also provides an increased surface contact area for distribution of the loading force into the deck. In other words, the greater the contact surface area of the portion of the hook extending through opening 12, the greater the surface area of deck 14 (within opening 12) to receive such force. Again, as discussed hereinabove, the distribution of the loading force over a greater surface area will reduce the likelihood that the deck hook will cause damage to aluminum deck.

In addition to providing increased engagement surface area for distribution of the loading force, the novel design of the present invention also provides a deck hook which is capable of accepting a loading force from multiple directions. Those skilled in the art will understand that prior art deck hooks were designed to accept a loading force from one general direction, and thus were installed in a particular orientation. In particular, prior art deck hooks were not designed to safely accept vertical loads and/or loads applied from the neck-side of the hook. The rotating leg/foot design of the present invention not only increases the engagement surface area of the device, but also serves to lock hook 10 to deck 14. In other words, once hook 10 is installed to deck 14, it cannot be removed from deck 14 without the unlocking/rotation of foot 24. This thus allows the application of a loading force to eyelet 18 from any direction without risk of the hook being inadvertently disengaged from opening 12. The increased engagement surface area provided on hook 10 also ensures that such hook can safely accept a loading force from any direction, including a vertical force or a force applied from the fixed leg side of the hook.

Figure 4:
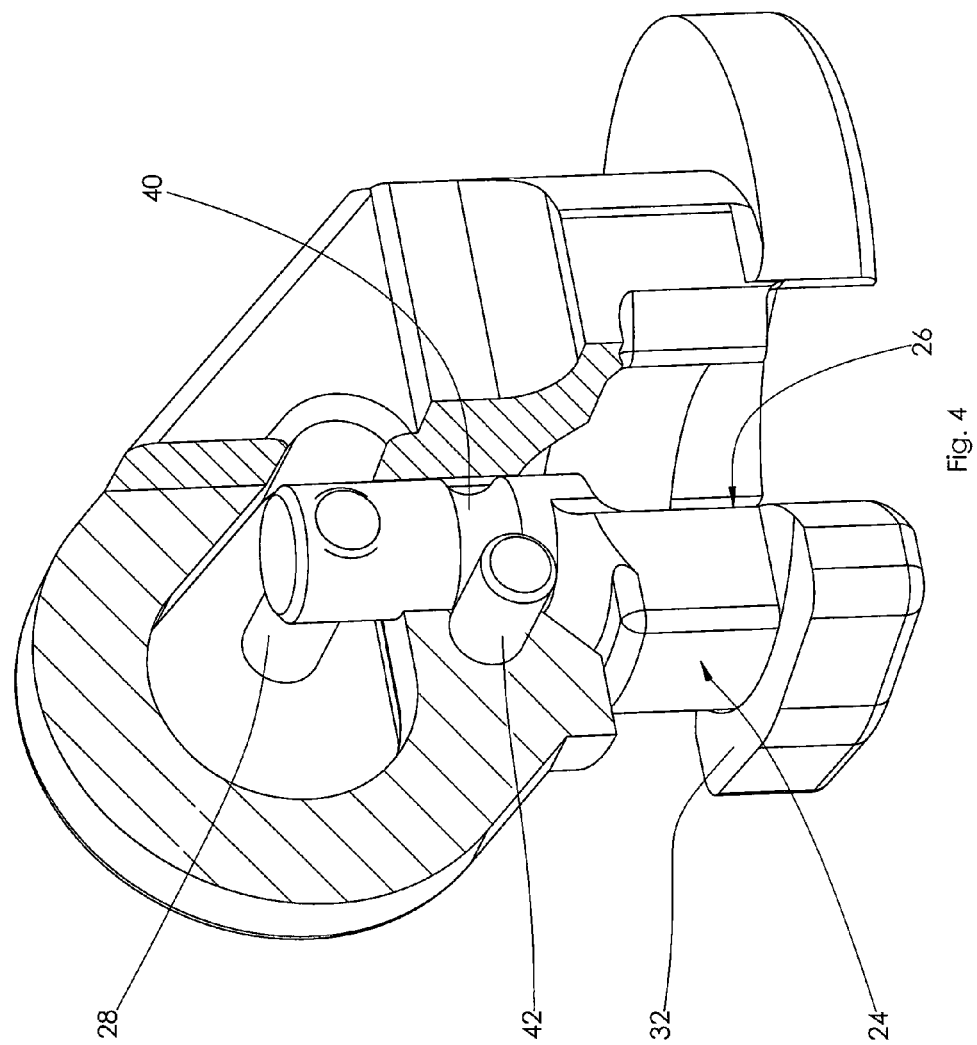
FIG. 4 is a detail of the rotatable leg of the hook shown in FIGS. 1 and 2.

It is contemplated herein that the rotation of leg 26 with respect to body number 16 may be accomplished in various ways, including the configuration shown in FIGS. 3-4. In this arrangement, leg 26 is provided with an upper cylindrical portion 36 sized to pass through an opening 38 formed in body member 16. Cylindrical portion 36 is formed with a circumferentially-extending groove 40. A pin 42 is installed through body member 16 perpendicular to cylindrical portion 36 and located to engage groove 40. Pin 42 thus secures cylindrical portion 36 within opening 38, while allowing rotation of cylindrical portion 36 with respect to body member 16. Because leg 26 and foot 24 are stepped away from cylindrical portion 36, rotation of cylindrical portion 36 causes foot 24 to rotate between the locked and unlocked position.

An alternative embodiment of the present invention is shown in FIG. 5. More particularly, hook 10' includes a body member 16' defining a lashing eyelet 18', a fixed leg 20' and a first foot 22'. Hook 10' further includes a displaceable leg 26' which supports foot 24'. A handle 28' may be secured to one end of leg 26' to facilitate translation of leg 26' along guide slot 50 formed in body member 16'. A spring 52 may be utilized to continuously bias leg 26' to the securement position. Hook 10' may further include a latch to lock leg 26' in the securement position, such latch requiring manual release before leg 26' can be moved to the insertion position, thereby reducing/eliminating any likelihood of inadvertent disengagement of hook 10' from deck 14. It is contemplated herein that leg 26' may be displaceably secured to body member 16' utilizing mechanical elements other than guide slot 50, e.g., a track and rail securing system.

It will be appreciated that the present invention has been described herein with reference to certain preferred or exemplary embodiments. The preferred or exemplary embodiments described herein may be modified, changed, added to or deviated from without departing from the intent, spirit and scope of the present invention, and it is intended that all such additions, modifications, amendments and/or deviations be included in the scope of the present invention.

What is claimed is:

1. A deck hook for removably coupling with an engagement opening formed in the deck of a vessel, said engagement opening having a diameter D1, said deck defining an upper surface and a lower surface, comprising:
   a body member;
   a lashing eyelet located at one end of said body member;
   a first foot connected to the other end of said body member, said first foot positioned and sized to engage at least a portion of said lower surface of said deck; and
   a second foot positioned to cooperate with said first foot to secure said hook to said engagement opening, said second foot movable between an insertion position wherein said first foot and said second foot define a diameter D2 and a securement position wherein said first foot and said second foot define a diameter D3, said diameter D2 being less than said diameter D1, and said diameter D3 being greater than said diameter D1.

2. The deck hook according to claim 1, wherein said second foot is rotatable with respect to said body member.

3. The deck hook according to claim 2, further comprising:
   a first leg connecting said first foot to said body member;
   a second leg extending from said body member and rotatably connected thereto; and
   wherein said second foot extends from said second leg, said second leg being rotatable between said insertion position wherein said first foot and said second foot define said diameter D2 and said securement position wherein said first foot and said second foot define said diameter D3.

4. The hook according to claim 3, wherein said first leg and said second leg define a surface contact area having a diameter D4 when said second leg is in said securement position, and wherein said diameter D4 is substantially equal to said diameter D1.

5. The deck hook according to claim 3, further comprising a locking mechanism for securing said second leg in said securement position.

6. The deck hook according to claim 5, wherein said locking mechanism includes a detent located within said body member.

7. The deck hook according to claim 3, further comprising a biasing mechanism for biasing said second leg to said securement position.

8. The deck hook according to claim 7, wherein said biasing mechanism includes a spring engaged with said body member.

9. The deck hook according to claim 3, further comprising a latching mechanism for securing said second leg in said securement position.

10. The deck hook according to claim 3, further comprising a handle secured to said second leg for rotating said second leg from said insertion position to said securement position.

11. The deck hook according to claim 3, wherein said second leg includes a circumferentially-extending groove; and further comprising a pin extending through said body member and engaging said groove whereby said second leg is rotatably secured within said body member.

12. The deck hook according to claim 1, wherein said second foot is displaceable with respect to the said body member.

13. The deck hook according to claim 12, further comprising a second leg, said second foot being secured to one end of said second leg; and wherein said body member includes a guide slot for engagement with the other end of said second leg whereby said second leg can be displaced along said body member to move said first foot and said second foot between said insertion position and said securement position.

14. The deck hook according to claim 13, further comprising a biasing mechanism for biasing said second leg and said second foot into said securement position.

15. The deck hook according to claim 13, further comprising a locking mechanism for locking said second leg and second foot in said securement position.

16. The deck hook according to claim 13, further comprising a handle secured to said second leg for displacing said second leg from said insertion position to said securement position.

* * * * *